United States Patent Office 3,508,138
Patented Apr. 21, 1970

3,508,138
GENERATOR WITH PLURAL OUTPUT COILS CONNECTED IN EITHER SERIES OR PARALLEL
Oskar Hermann Schatz, Mulheim, Germany, assignor to Fried. Krupp Gesellschaft mit beschrankter Haftung, Essen, Germany
Filed July 5, 1967, Ser. No. 651,311
Claims priority, application Germany, July 6, 1966, 1,538,344
Int. Cl. H02p 9/02
U.S. Cl. 322—90                    9 Claims

ABSTRACT OF THE DISCLOSURE

A generator for motor vehicles having a plurality of coils, in which voltages are induced when the generator is driven with means for connecting the coils so that the voltages therein are additive for low speed generator operation or so that the currents in the coils are additive for high speed generator operation.

Motor vehicles require a considerable amount of electric energy, for instance for the light installation, the starter, the window wiper, etc. Therefore, there exists the tendency to build generators which furnish greater power, while on the other hand the idling range is of great importance for the dimensioning of the generator since according to the general opinion in industry, the vehicle motor will during city driving on an average idle over 30% of the time. This last mentioned fact makes it imperative so as to design the generator of motor vehicles that it will have a relatively low starting speed. In other words, the speed at which the generator starts to furnish power must be so much lower than that generator speed which corresponds to the idling speed of the engine that during the idling period, the generator will be able to furnish a power which is sufficient for its energy requirement.

It is a well-known fact that with given dimensions of the generators, the obtainable maximum power will be so much less, the less the starting speed is. Thus, the requirement for low starting speeds is opposed by the requirement for high power and, more specifically for a wide speed range up to the highest admissible speed of the generator. When heretofore desiring to meet these two opposite requirements, the designer was forced to provide the power furnishing coil not only with a high number of windings corresponding to the desired low starting speed, but it was also necesary in order to take over the required high power capacity, and this was done by employing large conduit cross sections in the coil furnishing the power and by providing high exciting power. This, however, went at the expense of large dimensions of the generator and high manufacturing costs.

It is an object of the present invention to provide a generator for motor vehicles which will overcome the above mentioned drawbacks.

It is another object of this invention to provide a generator for motor vehicles as set forth above which will result in a high economy meeting the requirements of modern motor vehicle traffic.

These and other objects and advantages of the invention will appear more clearly from the following specification in connection with the accompanying drawings, in which:

FIGURE 1 is a graph showing characteristics for a motor vehicle generator with a coil furnishing one-phase power.

FIGURES 2–7 diagrammatically illustrate one-phase power furnishing coils of motor vehicle generators according to three different embodiments of the invention in series and in parallel arrangement respectively.

The above objects have been realized according to the present invention by shifting at least two coil branches of the power furnishing coil during the operation from series arrangement to parallel arrangement and vice versa. At least two winding branches of said power furnishing coil are so designed that by means of the series arrangement, the starting speed will be reduced below the generator speed corresponding to the idling speed of the engine, whereas when employing the parallel arrangement, the maximum generator output is obtainable. Accordingly, with a generator for alternating current, the winding branches are during the operation shiftable from Y-connection to delta connection and vice versa.

Figure 2:
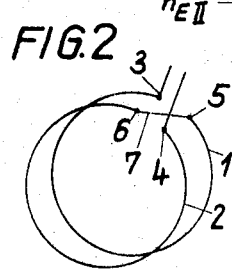
Figure 3:
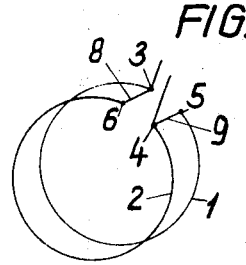

Referring now to the drawings in detail, with the embodiment of FIGS. 2 and 3, the power furnishing coil of the motor vehicle generator has two winding branches which are diagrammatically indicated by the circles 1, 2. One end each 3, 4 of the coil branches 1, 2 is connected to the network. When a series arrangement according to FIG. 2 is involved the two other ends 5, 6 of the coil branches 1, 2 are connected to each other by means of the conductor 7. On the other hand, when a parallel arrangement is provided according to FIG. 3 the point 3 is connected with the point 6, and the point 5 is connected with the point 4 by means of conductors 8, 9.

According to the series arrangement in FIG. 2 the coil has two effective windings in contrast to only one effective winding with the parallel arrangement according to FIG. 3. In the last mentioned instance, however, twice the cross section of the conductor is available as with the series arrangement according to FIG. 2 so that the current corresponding to the high output can flow without undue heating of the winding.

Figure 1:
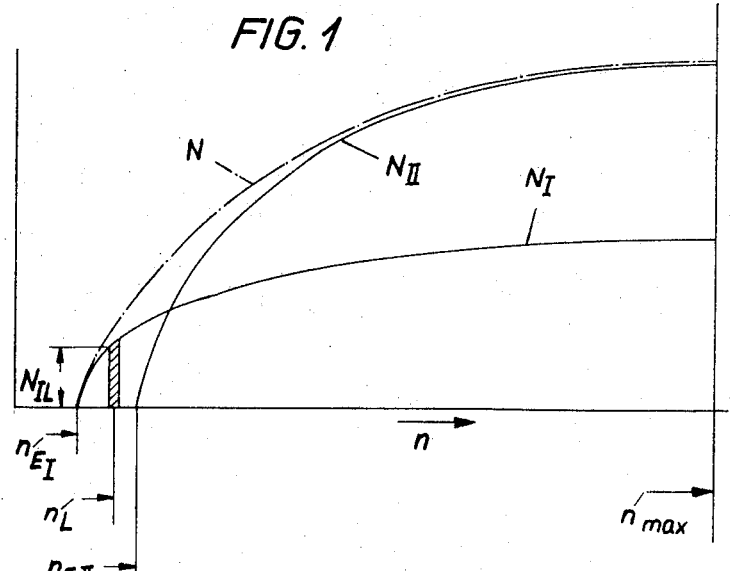

In FIG. 1 there is plotted for a generator according to FIGS. 2 and 3, over the generator speed $n$ the power furnished by the generator. $N_I$ is the power output during the series arrangement according to FIG. 2, and $N_{II}$ represents the power output during parallel arrangement in conformity with FIG. 3. Inasmuch as with an arrangement in series, the number of windings of the coil is twice as high as with a parallel arrangement, in the first instance a starting speed $n_{EI}$ is obtained which is half the magnitude as the starting speed $n_{EII}$ during parallel arrangement. The starting speed $n_{EI}$ is less than the speed $n_L$ of the generator which corresponds to the motor speed. Accordingly, in the idling area indicated by shading, a considerable power output $N_{IL}$ is obtained. This output for the energy requirement of the generator, if when city driving the idling periods represent a high percentage of the total time of operation of the vehicle. This idling output of the generator is also not obtainable with the parallel arrangement because the starting speed $n_{EII}$ is higher than the speed which corresponds to the motor idling.

On the other hand the power $N_{II}$ will with the parallel arrangement rise from zero at the starting speed $n_{EII}$ so as to rise steeply with increasing speed to such an extent so that said output $N_{II}$ soon exceeds the output $N_I$ during the arrangement in series and with the maximum admissible speed $n_{max.}$ of the generator reaches its maximum value which is twice as high as the output during series arrangement. Thus, with the parallel arrangement during the major portion of the operation, a considerably higher output is available than would be the case with series arrangement.

According to the present invention when the speed at which the curves $N_I$ and $N_{II}$ intercept has been obtained, the connection of the series arrangement according to FIG. 2 is shifted to a parallel arrangement according to FIG. 3. Thus, on one hand in the idling range, there is obtained a sufficiently high power $N_{IL}$, and on the other hand within the driving range there is obtained a high power delivery and thus a good exploitation of the generator.

The dot-dash line in FIG. 1 indicates the characteristic of a generator which after heretofore prevailing opinions is so designed that it furnishes the respectively required high power in the idling range as well as in the driving range. Such a generator would for purposes of obtaining the required power capacity have to be dimensioned considerably greater than a corresponding generator according to the present invention and would consequently be considerably more expensive. The output N of such a generator would with small speeds furnish somewhat higher output than a corresponding generator of the invention. However, as indicated by shading in FIG. 1 this would not amount to much in the idling range. Furthermore, it is to be taken into consideration that in the speed range lying above $n_L$, in which the power according to the dot-dash line is considerably higher than the output $N_I$; $N_{II}$ of a generator according to the invention the generator will hardly work. It is known that the vehicle motor during the starting phase is always very quickly accelerated from the idling speed to the speed corresponding to the respective velocity range. Therefore, there is a quick transgression from the idling range into the driving range in which the output $N_{II}$ practically equals the output N according to the dot-dash line. Thus, the wedge formed in FIG. 1 between the dot-dash lines N and the lines $N_I$ and $N_{II}$ within the range of the point of intersection of these lines has no harmful effect for the operation of the generator.

The shifting over from the arrangement in series to arrangement in parallel is preferably effected automatically by means of a switch. This switch could by means of a spring be held in its position for series arrangement, whereas the position for arrangement in parallel could be brought about by a magnetic coil activated for instance by a current proportional to the current furnished by the generator, in such a way that at a certain output of the generator which could be determined by the adjustment of the spring, the switch would automatically bring about the shift over from series arrangement to parallel arrangement. In a corresponding manner, when the output drops below the limit output, the series arrangement could be automatically restored.

It is, of course, also possible to bring about the shift over from series to parallel arrangement and vice verse, by other signals as for instance by the frequency of the battery charging current furnished by the generator, from the speed of the generator, from the battery voltage, or from the charging voltage.

In order to avoid instability, the signal for shifting over from series to parallel arrangement will be so that the said shifting over will be effected at a somewhat higher speed than the shifting back to series arrangement. In some circumstances during the shifting over operation the exciter current will be interrupted.

Figure 4:
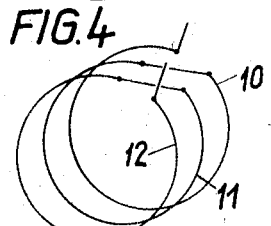
Figure 5:
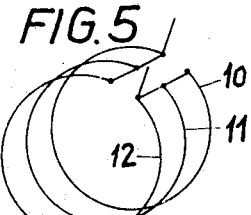

As will be evident from FIGS. 4 and 5, instead of two winding strands, also more strands can be arranged in series or in parallel. For instance, according to FIG. 4, three winding strands 10, 11, and 12 are arranged in series, whereas according to FIG. 5 they are arranged in parallel. In this instance the starting speed of the series arrangement is only ⅓ of the starting speed of the parallel arrangement.

Figure 6:
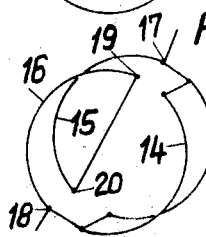
Figure 7:
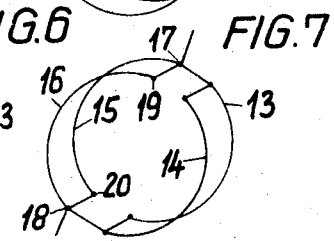

It is also possible to design only a portion of the power furnishing winding of the generator for shifting from series to parallel arrangement. A corresponding example is shown in FIGS. 6 and 7. According to these figures two winding strands 13 and 14 have both ends permanently connected to the network, whereas two further winding strands 15, 16 have only one point 17, 18 each connected to the network. Depending on whether the two other points 19, 20 are connected to each other or with the points 17, 18, series or parallel arrangement will be obtained for the winding strands 15 and 16. In this instance the ratio between starting speeds with parallel and series arrangement are less than 2:1.

Figure 8:
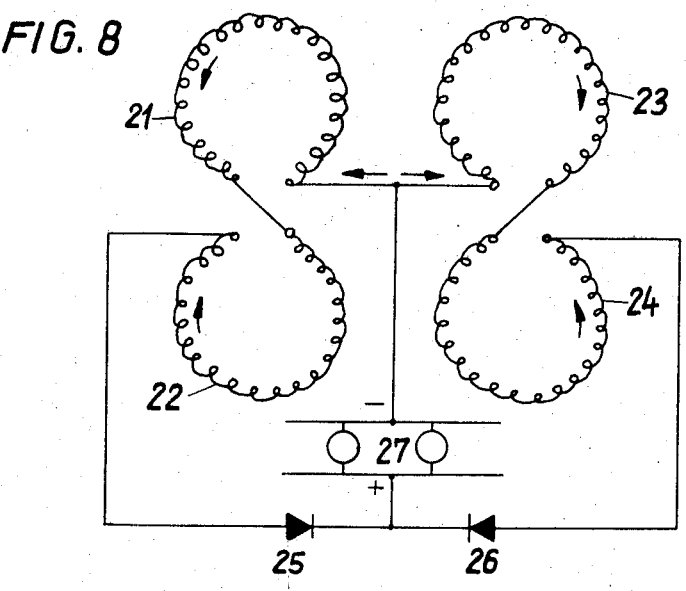
FIGURES 8 and 9 are circuits for a one-phase power furnishing coil of a motor vehicle generator according to one of the embodiments referred to above when in series and parallel arrangement respectively.
Figure 9:
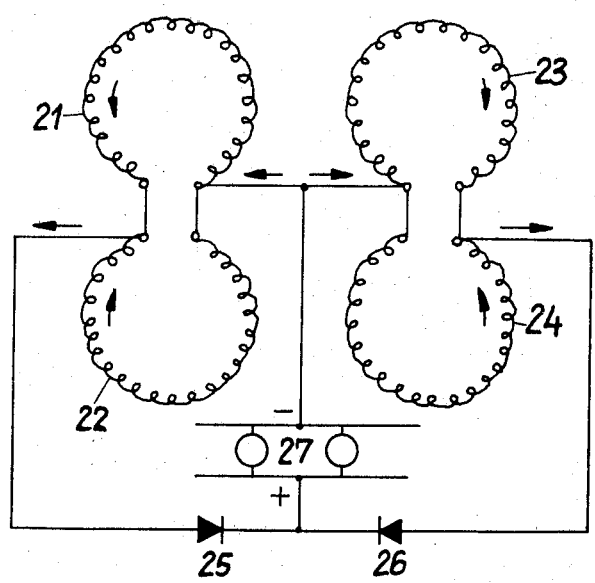

FIGS. 8 and 9 illustrate a generator coil with two pairs of winding strands 21, 22 and 23, 24. According to FIG. 8 the winding strands 21, 22 and 23, 24 are arranged in series, whereas FIG. 9 shows the winding strands 21, 22 and 23, 24 arranged in parallel. The two pairs of winding strands operate each via a rectifier diode 25, 26 together toward a consumer 27.

Figure 10:
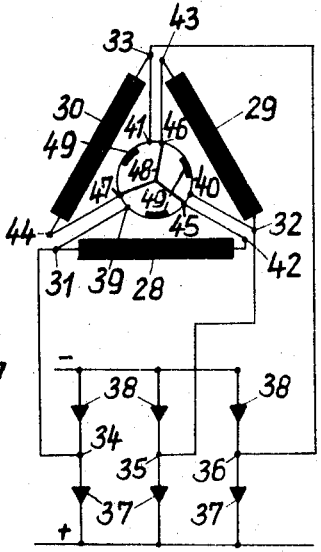
FIGURE 10 is a diagram for a further embodiment of the invention and, more specifically, for a motor vehicle generator for three-phase alternating current.

When a generator is concerned for three-phase or rotary current a shift over of the corresponding winding strands from Y-arrangement to delta arrangement corresponds to the shift over from series to parallel arrangement. A corresponding embodiment is shown in FIG. 10. The power furnishing coil of the generator comprises the three winding strands 28, 29, 30 which have one end each 31, 32, 33 connected with one point each 34, 35, 36 between the anode and the cathode of two rectifier diodes 37, 38 which in a group of three are connected to the plus and minus conduit of the network. The points 31, 32 and 33 are furthermore connected to the contact 39, 40, 41 which are uniformly distributed over a ring of a rotary switch. The other ends 42, 43, 44 of the winding strands 28, 29, 30 are connected to additional contacts 45, 46, 47 which in slightly spaced arrangement from contacts 39, 40, 41 are arranged on the ring of the rotary switch. The rotatable portion of this switch comprises a Y-shaped member 48 with three arms which in the illustrated position connect the contacts 45, 46 and 47 to each other. Between the arms of the Y member 48 at the circumference of the rotatable switch member, there are provided contact bridges 49.

According to the illustrated adjustment of the rotary switch, the winding strands 28, 29, 30 are arranged in Y-arrangement. This corresponds to the series arrangement of a one-phase generator according to FIGS. 1 to 9. Also in this instance the low starting speed has been realized. When the rotary switch has been so adjusted that the contacts 39 and 47, 40 and 45, 41 and 46 are connected to each other, delta arrangement of the winding strands 28, 29, 30 has been established. This corresponds to the parallel arrangement according to FIG. 1. In other words, the higher starting speed has been realized. In this instance the last mentioned higher speed with regard to the lower starting speed is expressed by the term $\sqrt{3:1}$.

It is, of course, to be understood that the present invention is, by no means, limited to the particular arrangements shown in the drawings, but also comprises any modifications within the scope of the invention, in which said generator is an alternator and supplies alternating current to said terminals, for example.

I claim:

1. In a generator for a motor vehicle in which the vehicle engine drives the generator having output terminals, a plurality of coils in said generator for supplying electric power to said terminals, each said coil having a voltage induced therein as the generator is driven, and switch means connected to the coils and to said terminals and having a first position wherein said coils are so interconnected with each other and with said terminals that the voltages induced in the coils are additive, said switch means having a second position wherein said coils are so interconnected with each other and with said terminals that the current flows in the coils are additive, whereby the generator is adapted with said switch means in its said first position to supply electric power at a usable voltage to said terminals at low driven speeds of said generator, whereas at higher driven speeds of said generator the switch means can be moved to its second position and the generator is enabled to supply electric power at maximum current to said terminals, there being at least two said coils and said switch means in its first position connects the coils in series between said terminals and in its said second position connects said coils in parallel between said terminals.

2. In a generator for a motor vehicle in which the vehicle engine drives the generator having output terminals, a plurality of coils in said generator for supplying electric power to said terminals, each said coil having voltage induced therein as the generator is driven, and switch means connected to the coils and to said terminals and having a first position wherein said coils are so interconnected with each other and with said terminals that the voltages induced in the coils are additive, said switch means having a second position wherein said coils are so interconnected with each other and with said terminals that the current flows in the coils are additive, whereby the generator is adapted with said switch means in its said first position to supply electric power at a usable voltage to said terminals at low driven speeds of said generator, whereas at higher driven speeds of said generator the switch means can be moved to its second position and the generator is enabled to supply electric power at maximum current to said terminals, there being at least three said coils and said switch means in its said first position connects said coils in a Y-configuration between said terminals and in its said second position connects said coils in a delta configuration between the said terminals.

3. In a generator for a motor vehicle in which the vehicle engine drives the generator having output terminals, a plurality of coils in said generator for supplying electric power to said terminals, each said coil having a voltage induced therein as the generator is driven, and switch means connected to the coils and to said terminals and having a first position wherein said coils are so interconnected with each other and with said terminals that the voltages induced in the coils are additive, said switch means having a second position wherein said coils are so interconnected with each other and with said terminals that the current flows in the coils are additive, whereby the generator is adapted with said switch means in its said first position to supply electric power at a usable voltage to said terminals at low driven speeds of said generator, whereas at higher driven speeds of said generator the switch means can be moved to its second position and the generator is enabled to supply electric power at maximum current to said terminals, there being at least four said coils and switch means in its said first position connects said coils between said terminals so that two thereof are in series, and another two thereof are in parallel with each other and with the two serially connected coils while in its said second position the switch means connects all of said coils in parallel between said terminals.

4. In a generator in which the vehicle engine drives the generator having output terminals, a plurality of coils in said generator for supplying electric power to said terminals, each said coil having a voltage induced therein as the generator is driven, and switch means connected to the coils and to said terminals and having a first position wherein said coils are so interconnected with each other and with said terminals that the voltages induced in the coils are additive, said switch means having a second position wherein said coils are so interconnected with each other and with said terminals that the current flows in the coils are additive, whereby the generator is adapted with said switch means in its said first position to supply electric power at a usable voltage to said terminals at low driven speeds of said generator, whereas at higher driven speeds of said generator the switch means can be moved to its second position and the generator is enabled to supply electric power at maximum current to said terminals, and means operable automatically for moving said switch means between its said first and said second positions in conformity with the speed to which said generator is driven.

5. In an alternator for a motor vehicle in which the vehicle engine drives the alternator; said alternator having output terminals, a plurality of coils in said alternator for supplying electric power to said terminals, each said coil having a voltage induced therein as the alternator is driven, and switch means connected to the coils and to said terminals and having a first position wherein it connects the coils in series between said terminals and said switch means having a second position in which it connects said coils in parallel between said terminals, whereby the alternator is adapted with said switch means in its said first position to supply electric power at a usable voltage to said terminals at low driven speeds of said alternator, whereas at higher driven speeds of said alternator the switch means can be moved to its second position and the alternator is enabled to supply electric power at maximum current to said terminals.

6. In an alternator for a motor vehicle in which the vehicle engine drives the alternator, said alternator having output terminals, at least three coils in said alternator for supplying electric power to said terminals, each said coil having a voltage induced therein as the alternator is driven, and switch means connected to the coils and to said terminals and having a first position wherein it connects said coils in a Y-configuration between said terminals, said switch means having a second position wherein it connects said coils in a delta configuration between said terminals, whereby the alternator is adapted with said switch means in its said first position to supply electric power at a usable voltage to said terminals at low driven speeds of said alternator, whereas at higher driven speeds of said alternator the switch means can be moved to its second position and the alternator is enabled to supply electric power at maximum current to said terminals.

7. An alternator according to claim 5, in which there are at least four said coils and said switch means in its said first position connects said coils between said terminals so that two thereof are in series, and another two thereof are in parallel with each other and with the two serially connected coils, while in its said second position the switch means connects all of said coils in parallel between said terminals.

8. An alternator according to claim 5, which includes means operable automatically for moving said switch means between its said first and said second positions in conformity with the speed at which said alternator is driven.

9. An alternator according to claim 5, in which means is provided for moving said switch means from its said first position to its said second position at a predetermined higher alternator speed and from its said second position to its said first position at a predetermined lower alternator speed.

References Cited

UNITED STATES PATENTS 2,607,815    8/1952    Davis _____ 322—93 X

ORRIS L. RADER, Primary Examiner

H. HUBERFELD, Assistant Examiner

U.S. Cl. X.R.

310—198; 322—93, 94